United States Patent [19]

Strubing

[11] 4,366,729

[45] Jan. 4, 1983

[54] COIL SPRING EXTENDER TOOL

[75] Inventor: Eric G. Strubing, Columbus, Ohio

[73] Assignee: Bell Telephone Laboratories, Incorporated, Murray Hill, N.J.

[21] Appl. No.: 239,429

[22] Filed: Mar. 2, 1981

[51] Int. Cl.³ .......................... B60P 1/48; B23P 19/04

[52] U.S. Cl. ....................................... 81/3 R; 29/227; 254/10.5

[58] Field of Search .................. 81/3 R; 29/225, 227; 254/10.5

[56] References Cited

U.S. PATENT DOCUMENTS

| | | | |
|---|---|---|---|
| 1,803,518 | 5/1931 | White | 29/227 |
| 1,817,877 | 8/1931 | Cawley | 140/89 |
| 1,951,953 | 3/1934 | Tollonitsch | 254/10.5 |
| 2,329,591 | 9/1943 | Christian | 254/10.5 |
| 2,976,609 | 3/1961 | Bredberg et al. | 29/225 X |
| 3,292,250 | 12/1966 | Miller | 29/227 |
| 3,570,102 | 3/1971 | Blomstrand | 29/227 X |
| 3,747,895 | 7/1973 | Martin | 29/227 |
| 4,156,959 | 6/1979 | Weisenburger | 29/225 |

*Primary Examiner*—James G. Smith
*Attorney, Agent, or Firm*—W. H. Kamstra

[57] ABSTRACT

A tool for extending and thereby restoring the compression of a fuse block spring (46). The tool comprises a rod (10) fixedly mounted at one end to extend from an end of one arm (14) of a pistol grip and at the other end is slotted to admit the spring tang as the rod (10) is inserted within the spring coils. When the rod (10) is stopped, either by a portion (48) of the spring or the fuse socket base, a finger (32) at the end of a sleeve assembly (18, 29) slidably fitted over the rod (10) is rotated to capture an initial coil of the spring. The sleeve assembly (18, 29) at its other end is pivotally connected to an end of a second arm (22) of the pistol grip, which second arm (22) is also pivotally connected to the first arm (14). The second arm (22) is closable on the first arm (14) to retract the sleeve assembly (18, 29) along the rod (10) to extend the spring (46) to the required length.

13 Claims, 8 Drawing Figures

COIL SPRING EXTENDER TOOL

TECHNICAL FIELD

This invention relates to devices and tools for adjusting the compression of coil springs and particularly to tools for restoring the length of coil springs of electrical fuse blocks and the like.

BACKGROUND OF THE INVENTION

The tendency of coil springs generally to relax their resistance to compressive forces applied thereto after a period of time is well known. This is frequently due to a permanent reduction in spring length, the condition being aggravated where the spring has been insufficiently heat-treated and is employed in an elevated temperature environment. The problem becomes significant where the springs are employed as compressive, electrically conductive backstops for electrical fuses in fuse blocks, for example, where the reliability of the fuses may be directly affected. In such applications, the springs are frequently formed to terminate at the fuse contacting ends in a straight tang extending diametrically across the coils, which tang constitutes the contact surface for the fuse. At its other end, the fuse spring may terminate diametrically across the coils and is formed at a right angle in a straightened axial segment extending through the fuse socket base to form an electrical terminal. Known spring extenders of the character described, for example, in U.S. Pat. No. 2,329,591 of H. C. Christian, issued Sept. 14, 1943, designed to hook the longitudinally extending end loops of conventional coil springs are not readily adaptable to adjust such fuse block springs. An additional consideration is the fact that a fuse block spring is normally installed within a relatively inaccessible fuse socket. It is thus the problems presented by the particular character and installation of fuse block springs to which the extender tool of the present invention is chiefly directed.

SUMMARY OF THE INVENTION

A spring extender tool according to the invention especially adapted to adjust the length of fuse block springs, in one illustrative embodiment, comprises an end-slotted rod fixedly mounted to extend from an end of one lever arm of a pistol grip, the end slot being dimensioned to fit about the end tang of the spring under adjustment. The diameter of the rod is determined to permit its insertion within the spring coils and the length of the slot is more than sufficient to permit insertion of the rod until stopped by the perpendicular tang of the terminal end of the spring. A two-section sleeve assembly is slidably fitted about the slotted rod and is pivotally mounted at the end of a second lever arm forming the piston grip. At its opposite end, a rotatable section of the sleeve assembly is provided with a helical finger adapted to capture one coil of the spring as the rotatable section is manually turned after the slotted rod has reached the end of its insertion. The separated arms of the pistol grip are then closed to a predetermined stop to withdraw the sleeve assembly, thereby drawing the fuse spring to a length as determined by the compression requirement of the spring. Manual rotation of the sleeve section is facilitated by a knurled finger wheel.

BRIEF DESCRIPTION OF THE DRAWING

The organization and operation of a spring extender tool according to the invention together with its features will be better understood from a consideration of the detailed description of one illustrative embodiment thereof which follows when taken in conjunction with the accompanying drawing in which.

DETAILED DESCRIPTION

Figures 2, 3, 4, 5, 6:
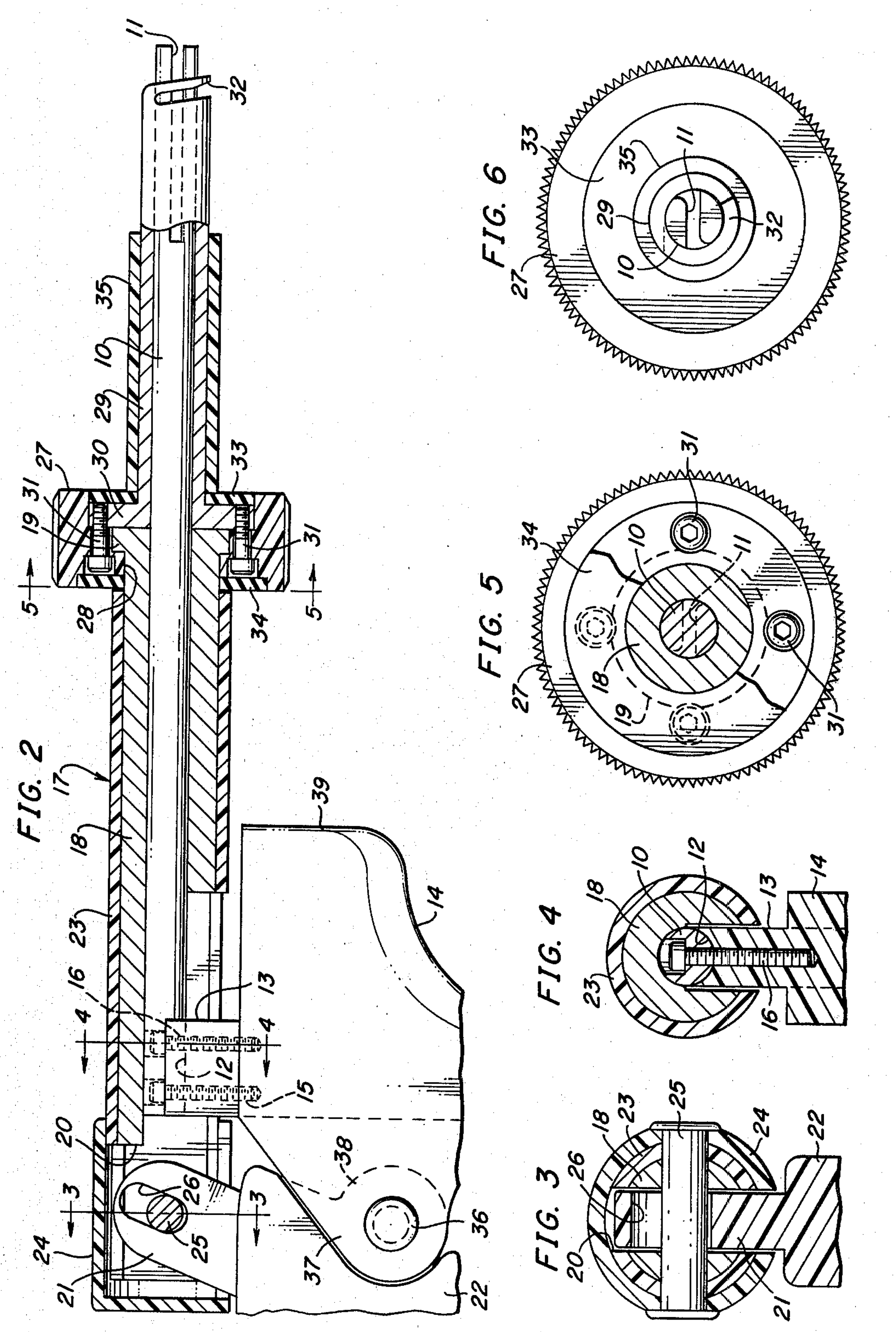
FIG. 2 exposes in a slightly enlarged partial section view the details of the operative elements of the tool of FIG. 1.
FIG. 3 shows a section view of the pivot mechanism of the tool of FIG. 2 taken along the line 3—3.
FIG. 4 shows a section view of the rod and sleeve retention arrangement of the tool of FIG. 2 taken along the line 4—4.
FIG. 5 depicts an end and section view of the finger wheel assembly of the tool of FIG. 2 from the line 5—5 forward.
FIG. 6 is an end view of the tool of FIG. 2 looking rearward.

One illustrative manually operated spring extender tool according to the principles of the invention is shown in side view in FIGS. 1 and 2 as comprising a rod 10 having at one end a diametric slot 11 formed therein along its longitudinal axis for a distance to be considered hereinafter. At its other end, rod 10 is cradled in a semi-circular seat 12 (FIG. 4) formed at the end of a tab 13 extending upward from one lever arm 14 of the tool pistol grip. Rod 10 is fixedly mounted on tab 13 by any suitable means such as by screws 15 and 16. Slidably mounted and rotatable on rod 10 is a two-part sleeve assembly 17 comprising a first section 18 having an annular, outwardly extending flange 19 at the forward end of the tool. At its other end, sleeve section 18 has a complete vertical slot 20 formed therein dimensioned to slidably admit an upward extending tab 21 of a second lever arm 22 forming the tool pistol grip. Slot 20 is extended to form an additional, partial slot extending toward the forward end of sleeve 18, the partial slot being dimensioned to slidably admit tab 13 of arm 14. Rod 10 and sleeve section 18 are formed by any suitable metallic material to ensure long life. Fitted over sleeve section 18 is an outer sheath 23 formed of a rigid, electrically insulative material similarly slotted in the manner of the slots of sleeve section 18. An electrically insulative cap 24 is fitted over the end of sleeve section 18 and its insulative outer sheath 23, also suitably slotted on its underside to conform to the slotting of sleeve section 18 and insulative sheath 23. As more clearly shown in FIG. 3, a pin 25 extends diametrically through sleeve 18, sheath 23, and cap 24, which pin is dimensioned to slidably ride in a slot 26 provided therefor in tab 21 of lever arm 22.

At the forward end of the spring extender tool, during its assembly, sleeve section 18 is passed through the central bearing aperture of an electrically insulative, knurled finger wheel 27 until the flange 19 of sleeve section 18 abuts a corresponding, inwardly extending annular flange 28 presented in the bearing aperture. Flanges 19 and 28 are dimensioned to permit free rotation of finger wheel 27 with respect to sleeve section 18. A second sleeve section 29 having an outwardly extending annular flange 30 at one end, is rotatably positioned about central rod 10 until flange 30 abuts flange 19 of sleeve section 18. At this slidable junction, flange 30 is fixedly joined to finger wheel 27 by any convenient means such as by screws 31 (see also FIG. 5). At its other end sleeve section 29 is partially circumferentially slotted to present a helical finger 32 (FIGS. 7 and 8) dimensioned and formed to capture a portion of the initial coil of the springs with which the spring extender is designed for use (FIG. 8). Finger wheel 27 is inset forward and back to permit the seating of flexible, electrically insulative protective grommets 33 and 34, respectively. A final electrically insulative sheath 35 is fitted above sleeve section 29 terminating short of the end of sleeve section 29 to permit insertion of its end into the fuse socket, the inside diameter of which determines the outside diameter of sleeve section 29.

Lever arms 14 and 22, making up the pistol grip of the extender tool, and which are preferably formed of a rigid, electrically insulative material, are pivotally joined by a pin 36 extending through interfitting lugs 37 and 38 extending from each lever arm to the other to form a hinge near the upper end of the pistol grip. Each of the arms 14 and 22 is oppositely flared at its upper end to provide a pair of hand rests 39 and 40 to ensure a reliable hand grip of the tool. Lever arms 14 and 22 are maintained in normal, unoperated and separated positions by a coil spring 41 fitted therebetween and held in place on the arms by a pair of lungs 42 and 43 extending therefrom. A stop to limit the closing of arm 22 on arm 14 is provided on the latter comprising an adjustable screw 44 and a lock nut 45.

Figures 1, 7, 8:
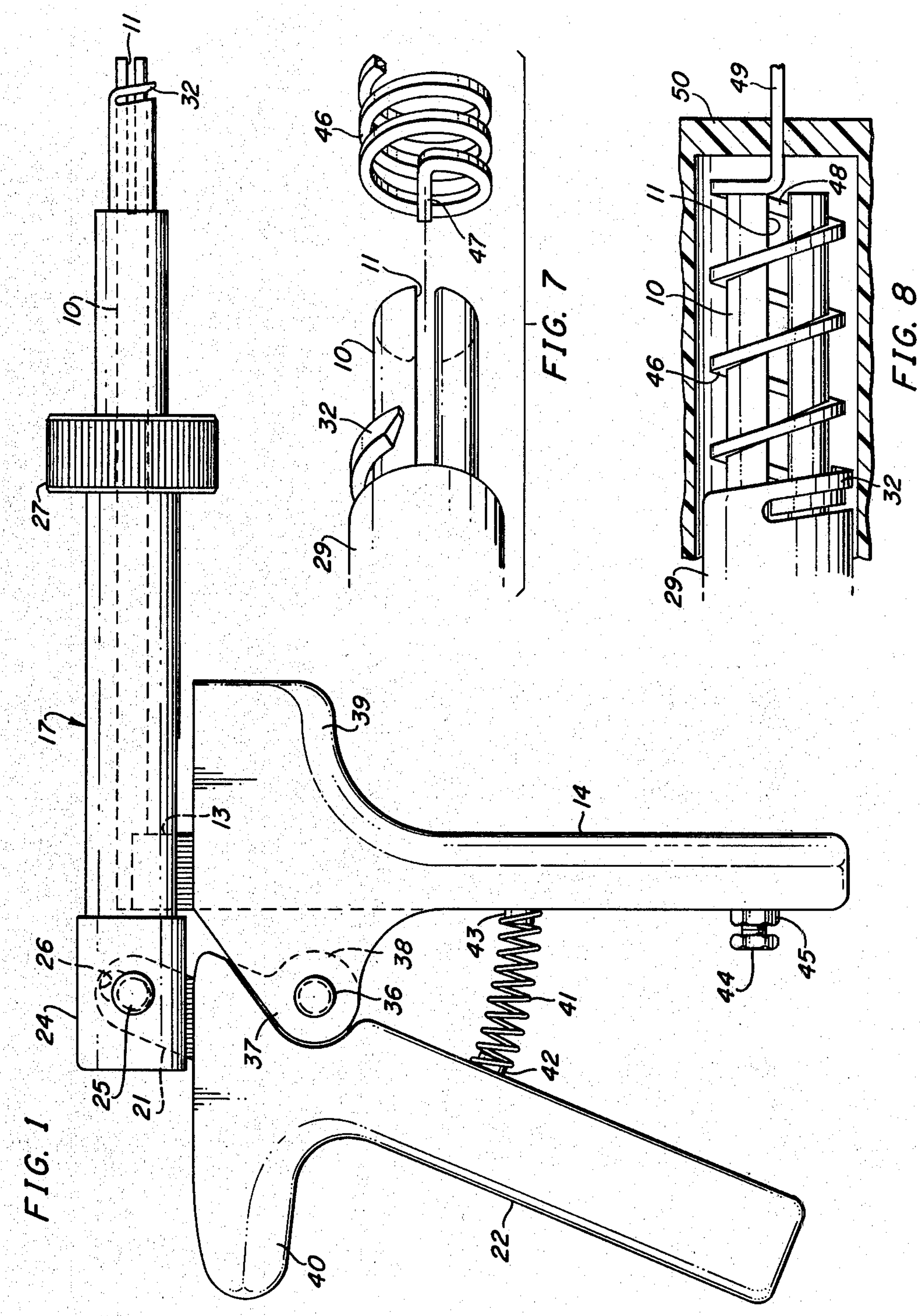
FIG. 1 depicts in side view an illustrative, unoperated spring extender tool according to the invention.
FIG. 7 shows the operative end portion of the tool of FIGS. 1 and 2 in a position preparatory to its engagement with a portion of a fuse block spring to be adjusted.
FIG. 8 shows the operative end portion of the tool of FIGS. 1 and 2 after its operation and in a final position with respect to a fuse block spring after its extension to a predetermined length.

An illustrative operation of a spring extender tool of the invention may be demonstrated with particular reference to FIGS. 7 and 8, the former showing the operative end of the tool preparatory to its engagement with a portion of a typical fuse block spring 46. Horizontal slot 11 of rod 10 is shown in alignment with the straight horizontal tang 47 of springs 46. Spring 46 terminates in a tang diametrically across the coil 48 and is formed at a right angle in a straightened axial longitudinal extension comprising the fuse block terminal 49 extending through and anchored in the fuse block socket 50 a portion of which is shown in the figure. The tool end is manually inserted into the fuse socket within the coils of spring 46, tang 47 of the spring riding in slot 11 of rod 10. Slot 11 is determined as of sufficient length to admit tang 47 without spring compression, additional length being provided to accommodate tang 47 as the spring is subsequently stretched. Rod 10 is fully inserted within spring 46 until the helical finger 32 of sleeve 29 is in contact with the front tang 47 or the first helix of the spring. Finger wheel 27 is rotated clockwise thereby causing helical finger 32 of sleeve 29 to catch behind a portion of the spring coil terminating in tang 47 as shown in FIG. 8. Lever arm 22 of the tool pistol grip is now manually further closed on arm 14 to stop 44. Arm 22 operating about the fulcrum of pin 36 withdraws sleeve assembly 17 on rod 10 by means of its tab extension 21 operating on pin 25. As a result, finger 32 draws spring 46 out to a predetermined length required to restore its original compression. This will manifestly require some overwithdrawal to compensate for the relaxation of spring tension as the tool is removed. A final adjustment as to the degree of spring extension may be made by means of adjusting screw stop 44. The tool is removed by releasing lever arm 22 and rotating finger wheel 27 counterclockwise to free finger 32 of sleeve 29 from the initial coil of spring 46.

It was assumed in the foregoing description that the illustrative extender tool of the invention is to be employed in the adjustment of fuse block springs having all coils of equal diameter at the base of the fuse socket. Manifestly, the tool may be advantageously employed to adjust the compression of fuse block springs having coils of reduced diameter at the fuse socket base. In that case, rod 10 of the tool will be inserted through the spring until contact is made with a reduced diameter coil of the spring. What has been described is thus only one illustrative spring extender tool according to the invention and it is to be understood that various and numerous other arrangements may be devised by one skilled in the art without departing from the spirit and scope of the invention as limited only by the accompanying claims.

What is claimed is:

1. A tool for extending a coil spring (46) having at one end an end coil and at the other end a coil portion (48) extending inwardly toward the longitudinal axis of said spring, said tool comprising a pair of lever arms (14, 22) pivotally connected at one end and separated at the other ends to form a hand grip, characterized in a rod (10) fixedly mounted at one end to one of said lever arms (14), said rod (10) being dimensioned to slidably fit inside the coil of least diameter of said spring (46) to said coil portion (48), a first coaxial sleeve (18) slidably fitted over said rod (10) and pivotally connected at one end to an extension (21) at said one end of the other of said lever arms (22), and a second coaxial sleeve (29) slidably fitted over said rod (10) and rotatably secured to said first sleeve (18) at one end, said second sleeve (29) having a finger (32) at the other end adapted to capture said end coil of said spring (46) when said rod (10) is inserted inside said spring (46) and said second sleeve (29) is partially rotated, said spring (46) being extended between the end of said rod (10) and said finger (32) as said lever arms (14, 22) are closed.

2. A tool for extending a coil spring (46) as claimed in claim 1 in which said end coil of said spring (46) is formed to present a diametric tang (47) thereacross characterized in that said rod (10) has a slot (11) formed therein at the other end dimensioned to slidably admit said tang (47).

3. A tool for extending a coil spring comprising a first lever arm, a rod fixedly mounted at one end to one end of said layer arm and dimensioned at the other end to slidably fit within said coil spring up to engagement with stop means provided at one end of said spring, a first sleeve slidably fitted about said rod, a second sleeve slidably fitted about said sleeve and rotatably secured at one end to one end of said first sleeve, said second sleeve having formed at its other end a finger adapted to capture a coil of said spring at its other end as said second sleeve is rotated, and means for retracting said first and second sleeve along said rod comprising a second lever arm pivotally connected to said first lever arm and to the other end of said first sleeve.

4. A tool as claimed in claim 3 in which said rod has a longitudinal slot formed therein at its other end di-

UNITED STATES PATENT AND TRADEMARK OFFICE

CERTIFICATE OF CORRECTION

PATENT NO. : 4,366,729

DATED : January 4, 1983

INVENTOR(S) : Eric G. Strubing

It is certified that error appears in the above—identified patent and that said Letters Patent is hereby corrected as shown below:

Column 4, claim 3, line 55, after "said" delete "layer" and insert --lever--.

Signed and Sealed this

*Twenty-second* Day of *March 1983*

[SEAL]

*Attest:*

GERALD J. MOSSINGHOFF

*Attesting Officer* *Commissioner of Patents and Trademarks*